(12) United States Patent
Siraky

(10) Patent No.: US 8,296,964 B2
(45) Date of Patent: Oct. 30, 2012

(54) MEASUREMENT APPARATUS FOR THE ABSOLUTE DETERMINATION OF LENGTHS AND OF ANGLES

(75) Inventor: Josef Siraky, Donaueschingen (DE)

(73) Assignee: Sick Stegmann GmbH, Donaueschingen (DE)

(*) Notice: Subject to any disclaimer, the term of this patent is extended or adjusted under 35 U.S.C. 154(b) by 0 days.

(21) Appl. No.: 12/982,134

(22) Filed: Dec. 30, 2010

(65) Prior Publication Data
US 2011/0192045 A1 Aug. 11, 2011

(30) Foreign Application Priority Data
Feb. 9, 2010 (EP) .................................. 10153107

(51) Int. Cl.
G01D 5/347 (2006.01)
(52) U.S. Cl. .......................................... 33/706; 33/1 PT
(58) Field of Classification Search ................... 33/1 PT, 33/706, 707, 708
See application file for complete search history.

(56) References Cited

U.S. PATENT DOCUMENTS

| 4,534,113 A * | 8/1985 | Holstein | 33/707 |
| 4,550,504 A * | 11/1985 | Mehnert | 33/706 |
| 4,701,615 A * | 10/1987 | Schmitt | 33/706 |
| 5,708,367 A | 1/1998 | Tousson | |
| 5,959,295 A * | 9/1999 | Braun | 33/706 |
| 2001/0037580 A1* | 11/2001 | Tondorf | 33/706 |
| 2003/0172538 A1* | 9/2003 | Tondorf | 33/706 |
| 2007/0186432 A1* | 8/2007 | Hauch et al. | 33/708 |
| 2007/0256313 A1* | 11/2007 | McAdam | 33/706 |
| 2009/0271998 A1* | 11/2009 | Carlen et al. | 33/706 |
| 2011/0173832 A1* | 7/2011 | Gribble et al. | 33/706 |

FOREIGN PATENT DOCUMENTS

| DE | 3244891 A1 | 6/1984 |
| EP | 1 270 312 A1 | 1/2003 |
| EP | 1 321 743 A1 | 6/2003 |

OTHER PUBLICATIONS

European Search Report EP 10153107.7, dated Aug. 9, 2010, seven (7) pages.

* cited by examiner

Primary Examiner — G. Bradley Bennett
(74) Attorney, Agent, or Firm — The Nath Law Group; Jerald L. Meyer; Stanley N. Protigal

(57) ABSTRACT

A measurement apparatus (10) for the absolute value determination of lengths or of angles, said apparatus having at least one reading head (14) and a physical scale (12) is provided, which has at least a partial section (18) with a connection (28) for another partial section (18) in a sequential arrangement. In this respect the partial section (18) includes a control unit (30) for the active determination of the position of the reading head (14) proximal to the partial section (18) as well as a storage element (32) in which an own position information of the partial section (18) within the physical scale (12) can be stored.

18 Claims, 3 Drawing Sheets

Figur 6b

MEASUREMENT APPARATUS FOR THE ABSOLUTE DETERMINATION OF LENGTHS AND OF ANGLES

The present disclosure relates to a measurement apparatus and to a method for the absolute value determination of lengths and of angle with a measurement apparatus or method for the absolute value determination of lengths or of angles.

Physical length scales are used for length measurements. The physical scale is provided with periods of graduation for incremental measurement and a reading head counts the number of periods of graduation on its movement to a measurement position. One has to initially carry out a reference run to determine the relative positions received from the incremental measurement also in absolute terms with regard to a reference point.

For this reason the physical scale is alternatively provided with an absolute code. Through this the initial calibration run can be omitted. However, a plurality of code tracks and require correspondingly complex physicals scales and complex reading heads. The longer the measurement track should be, the more powerful the coding has to be and a higher complexity is required from the additional code tracks.

Moreover, it is known to form a scale from a plurality of magnetic field sensors which are arranged in a row and to determine the position of a permanent magnet serving as a reading head by means of multiplexing. The absolute coding of the position of a respective magnetic field sensor consists of a plurality of permanent magnets spaced apart from one another and associated with one another, wherein the separation distance between each of the magnetic field sensors can be individually varied for each magnetic field sensor. The disadvantage of this is that each magnetic field sensor is already assigned a fixed position within the physical scale by this separation on production thereof. Through this the flexibility of the arrangement is limited. For example, if one were to combine two like coded magnetic field sensors then the unambiguous absolute coding is interrupted. Thus, the code must be matched to the length to be measured in the factory to use the most cost effective physical scale and/or the most cost effective reading head for the respective application.

DE 101 17 193 A1 describes an absolute value measurement system of angles or of lengths, in which the scale is composed of at least two partial sections which are formed in the same way for the absolute value determination. With the help of an additional absolute code track it is read out at which partial section the scanning head is located from which together with the absolute position within this partial section an absolute measurement value arises. Using this solution, none of the above-mentioned disadvantages are overcome as, on the one hand, it is necessary to provide the additional code track on the scale and to be able to read this with the scanning head, the mightiness of the additional scanning track, on the other hand, determines the maximum number of possible partial sections of the scale.

It is therefore desired to provide an absolute measurement system having a simple design which at the same time is as independent from the lengths to be measured as possible.

SUMMARY

This object is satisfied by a measurement apparatus for the absolute value determination of lengths and of angles with an apparatus having at least one reading head and a physical scale which has at least a partial section with a connection for another partial section in a sequential arrangement. The partial section includes a control unit for the active determination of the position of the reading head proximal to the partial section as well as a storage element in which an own position information of the partial section within the physical scale can be stored. The object is further satisfied by a method for the absolute value determination of lengths or of angles, using a reading head and a physical scale which is formed from a sequential arrangement of partial sections. A partial section actively measures the position of the reading head proximal to the partial section, wherein the position of the partial section within the sequential arrangement is determined by position information stored in the partial section. The absolute value is determined from the position within the partial section and the position of the partial section within the sequential arrangement. In this respect the solution is based on the basic idea of combining a physical scale from modules which are absolutely coded and are composed more or less of self-sufficient and active partial sections. Each partial section measures an absolute path information associated with the partial section, when a reading head is arranged proximal to the partial section. A desired measurement value can be determined with the aid of an information on where the partial section is situated within the physical scale.

BRIEF DESCRIPTION OF THE DRAWINGS

The disclosure will be described in the following also with view to further advantages and features by means of embodiments with reference to the included drawings. The Figures of the drawing show in.

DETAILED DESCRIPTION

Overview

Figure 1:
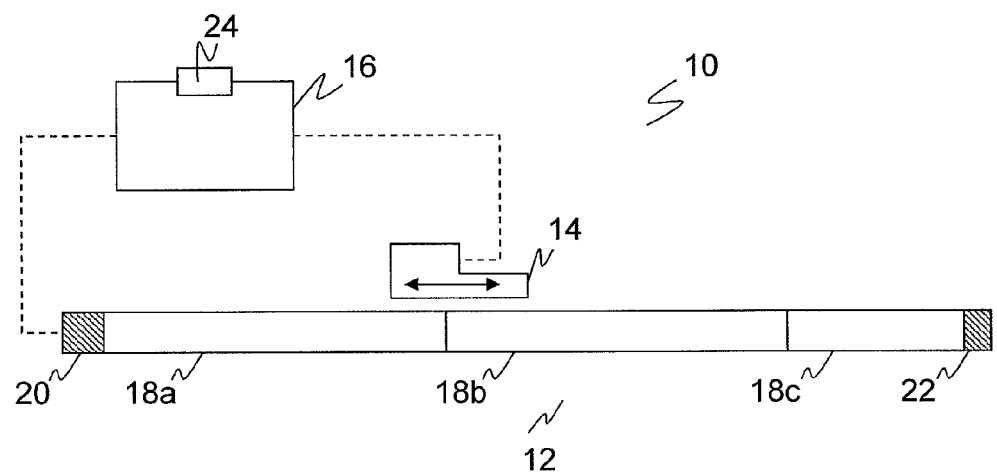
FIG. 1 a block illustration of a measurement apparatus having a physical scale made of modular partial sections.

The disclosed technique has the advantage that a very cost-effective compact and constructively small measurement system arises whose physical scale can be easily stored, easily packed away and easily transported due to the modular partial sections and which is simple to operate. In contrast to the prior art no time-consuming complex and cost-intensive absolute coding with a corresponding number of code tracks for the overall physical scale has to be defined. For example, for only 32 bits of storage space the stored position information now already allows several billion partial sections and thus practically allows any desirable length. For this reason merely the desired number of generic essentially like partial sections for the same basic system have to be arranged in a row in a cascade-like form, wherein on exceeding certain lengths electrical amplifications are to be provided in the physical scales. Albeit this length dimension highly accurate position determinations in the micrometer region are possible and depending on the embodiment and guiding accuracy also accuracies below this are possible. The measurement apparatus can be contact-free and wear-free and can also be carried out as a high protection type, such as IP67.

The partial sections are configured for active measurement, i.e. in dependence of the measurement process used they can generate either a magnetic field or an electric field. Through the connection for a further partial section a physical scale arises as a linear, cascaded arrangement of the desired number of partial sections. However, also a physical scale with only one partial section is already functional, as long as the connection is concluded, for example with an end section. As a general rule however, a plurality of partial sections are provided which each have a first connection for a partial section arranged upstream thereof and a second connection for a partial section arranged downstream thereof. In this respect each partial section can be equipped with the further features described in the following, i.e. a controller, a memory and such like. The active measurement principle is in a position to also identify a plurality of reading heads.

The connection ensures at least for an electronic connection of the partial sections and, for example, includes a supply line or a data interface such as a serial interface or a bus interface. The connection preferably also simultaneously includes a mechanical connection to stably connect the partial sections to a physical scale.

The position information is preferably stored as a length measure. It then corresponds to the lengths of all partial sections which are added together between the respective partial section in which the position information is stored and a reference point. In other words the position information is the displacement or the offset of the partial section with respect to a zero point of the physical scale. Alternatively, however, also an abstract information, such as a numbering is sufficient. If, for example a central controller knows the sequence and the type of all partial sections then from this the displacement which is a length measure with respect to the zero point can be calculated in a simple manner.

The physical scale preferably is self-configured in that the control unit is configured to receive its own position information from a connected other partial section or it is configured to derive its own position information from a position information of a connected other partial section. In this respect, each partial section queries whether a further partial section is connected at its connection in a chain-like manner and transfers all of the required information further down in the chain. For example, the first partial section starts with the position information zero and at each transition to a partial section arranged downstream thereof this position information is increased. Alternatively it is restarted at zero, but for each case it is respectively increased by the length of the partial section. Following the conclusion of the self-configuration every partial section is provided with the separation to the zero point of the physical scale in this way. In this respect even more preferably addresses for the communication are simultaneously assigned. The communication address and the position information can be identical to one another or can be derived from one another.

The reading head is preferably adapted to generate a respective measurement value for each partial section at a transition between two partial sections, so that from the difference of the two measurement values a correction value for the transition can be derived. On arranging the partial sections next to one another an error arises in the form of a gap which results from non-preventable environmental factors such as mating of the partial sections or temperature dependent factors which can be compensated in this way. The correction value is provided to all subsequent partial sections in a further embodiment relative to the zero point so that also these partial sections can be correspondingly corrected.

For this reason the reading head is even more preferably configured so long so that at a transition its position with respect to both partial sections can be measured and for this reason the reading head has two effective measurement zones for each of the partial zones adjacent to the transition. These partial zones can physically be similar to one another and can simply be defined by the signals they obtain from the active partial section or also be defined as partial zones which are separated from another in a dedicated manner. In this way the reading head practically forms a physical scale itself which measures the extension of the transition between the partial sections.

The reading head is preferably active and generates a field which interacts with a field generated by the physical scale. An active reading head can carry out the different compensations and calibrations itself and measure these themselves robustly through the generated field. Alternatively the reading head is passive and modifies a field generated by the physical scale or reflects the field to the physical scale. Such a reading head does not have the advantages of the active reading head, however, it is particularly cost-effective and insensitive.

The control unit is preferably configured to generate a field at each position of the partial section to evaluate whether a reading head is present proximal to the partial section and at which position the reading head is proximal to the partial section, wherein the result of the evaluation can be communicated via the connection. Each partial section thus independently carries out a measurement and directly transfers a measurement value instead of raw data which measurement value can be easily processed and requires no proprietary electrical interfaces.

A deviation of its own position measurement of the partial section to the reference is preferably stored in the storage element to calibrate the partial section. Thus, variations of length of the partial sections arising due to manufacturing conditions are considered up to millimeter precision, micrometer precision or even exacter. Thus, each partial section is precisely calibrated and matched to the corresponding measurement requirements.

The physical scale preferably has curved partial sections for an angle measurement. In this way a rotary switch arises in contrast to a length encoder for elongated straight partial sections. The measurement principle functions in the same way for both cases, as ultimately even an angle is an arcuate measure when the radius is scaled to a length. Although also other forms are plausible the curved partial sections preferably form a partial sector of a circle. The sequential arrangement of the partial sections is then cyclical i.e. the final partial section connects to the first partial section.

Numbers of rotation and/or angles larger than a plurality of 360° can be absolutely determined, as long as the control unit stores how frequently a certain reading head passes a partial section and from which direction a certain reading head passes a partial section.

The partial sections can even more preferably be bent to different radii of curvature, for example, in that the housing or the support of a partial section is made of an elastomer. Through this the radius of the circle formed from the connectable partial sections can be set within certain limits and can also be set with not too high an accuracy.

In a preferred embodiment a main control is provided which is electrically connected to the physical scale which main control is connected to the beginning and to the end of the sequential arrangement, in particular is also connected to the actively configured reading head. For example, the main control is the supply point for a supply voltage and a supply power of the measurement apparatus, the communication master, as well as the interface to a super-ordinate control of the measurement apparatus and it starts and coordinates the configuration modus and the calibration modus. The main control can cooperate with the control units of the partial sections. As far as nothing else is described functions of the main control can be transferred to the control units of all partial sections or be transferred to certain control units of special partial sections in a dedicated manner, and especially be transferred to a starting section and/or to an end section and vice versa.

Advantageously, a starting section is provided at the beginning of the sequential arrangement and an end section is provided at the end of a sequential arrangement, wherein in particular the main control is at least partially integrated into the starting section or into the end section. The starting section and/or the end section can likewise be configured as a partial section, this means part of the actual physical scale with absolute measurement divisions. Alternatively the starting section and/or the end section are merely simple connections, so that the connections of the partial sections do not remain free at the ends of the sequential arrangement, for example, to close a communication loop and a supply loop.

Physical scale and reading head are preferably configured for an inductive measurement, a capacitive measurement or a magnetic measurement of lengths or of angles. The physical scale has corresponding active code tracks with cores and similar switching elements whose electric field or magnetic field interacts with a matching counterpart in the reading head. Particularly advantageous is a capacitive measurement apparatus because its interaction is blind with regard to magnetic fields and for this reason is particularly well suited for a directly driven linear motor in which, for example, a magnetic measurement system would be disturbed.

The method can be configured in a simple manner through further features and in this respect shows similar advantages. Such further features are described exemplary but not conclusively in the dependent claims dependent on the apparatus claim.

The physical scale preferably configures itself in that sequentially each partial section starting with a first partial section assigns itself a position information in a self-configuration mode or is assigned a position information and subsequently places a partial section arranged down-stream thereof into the self-configuration mode. This self-configuration, for example occurs on switching on. If no partial section is arranged down-stream then the self-configuration is concluded.

Advantageously a respective measurement value for each partial section is generated when the reading head is situated at a transition between two partial sections and from the difference of the two measurement values a correction value for the transition is derived, wherein, in particular the position information of one of the two partial sections is compensated by the correction value. If the position information is a length measure the correction value can then be directly added and/or subtracted. Otherwise the correction value can be stored together with the position information to be considered later on during the calculation of measurement values.

The physical scale is advantageously calibrated in that each partial section stores deviations from a reference measure a zero point for the physical scale particularly for a reading head is determined and separation distances at a transition between two partial sections are corrected on the movement of the reading head over the transition to the zero point. The calibration thus includes three steps, wherein also only a single one of these steps can be carried out and at least leads to a partial calibration. Initially the partial sections are compared to one another using a reference, for example using a laser interferometer. Then a zero point and/or a reference point on the physical scale is/are selected by the user. The zero point can also be set to the beginning of the measurement scale, the end of the measurement scale or a different point on the measurement scale.

Finally, the gaps which are variable in their elongation at the transition between each of the two partial sections, which arise unavoidably, also due to the mechanical tolerances, are calibrated. This is always possible then, when a reading head is located proximal to a transition. A complete calibration is thus achieved by an initial run over the total length of the physical scale. Alternatively it is also plausible to work with a not yet fully calibrated system which sets expectation values for the transitions and always corrects these dynamically, when a reading head passes the transition. As long as only one reading head is present and this does not jump, i.e. it runs continuously on the physical scale one cannot arrive at a measurement position which has not been calibrated. The expectation values are thus only relevant for a plurality of reading heads or for discontinuous movements.

Advantageously for an initial determination of the position of reading heads each position of the measurement scale is examined by generation of local fields by means of position multiplexing whether a reading head is present, wherein subsequently only a local field is produced in the vicinity of a reading head during operation. For this reason, each partial section is subsequently activated and each position within a partial section is partially activated by means of position multiplexing until a reading head announces itself at a position and/or a reading head is recognized at a position. A plurality of reading heads are also reliably found by a complete scanning of the physical scale. The demand for the position multiplexing in the further operation is no longer required, as with the initial knowledge of the reading head position only the specific surroundings of the reading head have to be measured.

Configuration

FIG. 1 shows a block diagram of a measurement apparatus 10 which has a physical scale 12, a reading head 14 longitudinally displaceable along the physical scale 12, as well as a main control 16. The physical scale 12 is composed of a plurality of modular partial sections 18a-c arranged in a sequential arrangement having a starting section 20 and an end section 22. The starting section 20 and the reading head 14 are each connected to the main control 16, wherein alternatively or additionally also a starting section 14 and the reading head 16 can be connected to one another. The main control 16 has an interface 24, for example a hyperface interface, to connect the measurement apparatus 10 to a super-ordinate control.

The measurement apparatus 10 works with an arbitrary measurement principle, for example magnetically, inductively or capacitively. In this respect the physical scale 12 produces a local field as an active scale which interacts with the reading head 14 and thus enables a position determination of the reading head 14. Such measurement processes are known to the person of ordinary skill in the art, for example as inductive measurements, as magnetic measurements or as capacitive measurements. A passive reading head can also be used as an alternative to the illustrated active reading head 14, which passive reading head is, for example configured as a permanent magnet or as a dielectric medium and modifies or reflects the field generated by the physical scale in a passive manner.

Figure 2:
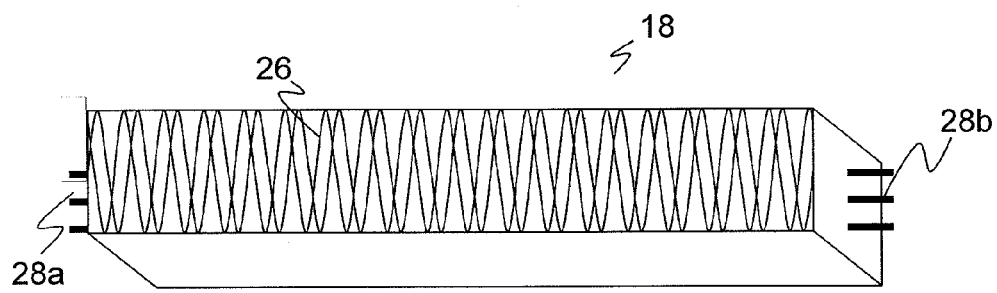
FIG. 2 a schematic three-dimensional outer view of a partial section in accordance with FIG. 1.

FIG. 2 shows a schematic three-dimensional outer view of a partial section 18 of the physical scale 10. Here and in the following the same reference numerals refer to the same features. A coding 26 for the absolute position determination can be found on the upper side facing the reading head 14 which is configured as a sinus track and a cosine track for a vivid illustration. In the practical application an arbitrary coding is selected, for example as copper tracks on a printed circuit board.

Connections 28*a-b* are provided on both sides of the partial section 18 with which a principally arbitrary number of partial sections 18 can be combined to a physical scale 12 in cascaded manner. Mechanical connections can be additionally provided, for example by means of integrated screws or separate connection elements.

Each partial section 18 has a standard length of e.g. 64 mm, of 128 mm, of 256 mm, of 512 mm or of 1024 mm. In cross-section small dimensions of e.g. only 10 mm×12 mm are possible and thus a correspondingly light reading head 14 is possible. There are no restrictions on the materials for the housing of the partial section 18, for example plastic materials, in particular made in an injection molding process, aluminum or stainless steel are plausible.

Figure 3:
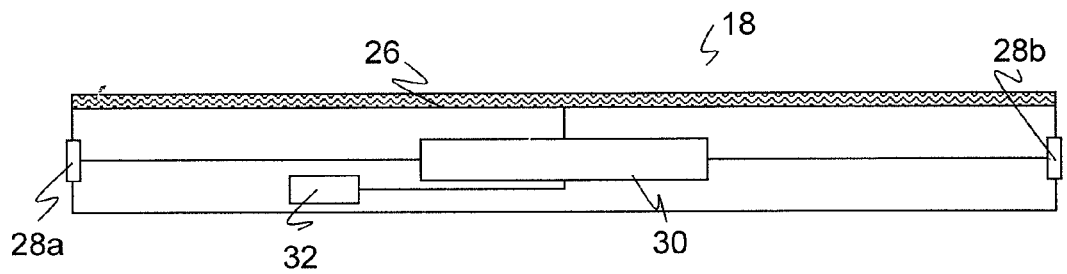
FIG. 3 a schematic sectional illustration of the partial section in accordance with FIG. 2.

FIG. 3 shows the partial section 18 as a block diagram. A control unit is connected to the circuit board 26 of the active coding, and both sides are connected to the connections 28*a-b* for further partial sections 18*a-c*. Moreover a preferably non-volatile memory 32, for example a memory 32 configured as an EEPROM is provided with which the control unit 30 interacts.

Each partial section 18 is calibrated in advance with the aid of a reference, for example by means of a laser interferometer. In this respect, deviations of the nominal length of the partial section 18 and its measurement division from the actual length are stored in a memory 32, so that the output measurement values can achieve an accuracy of up to 1 µm or also less.

Moreover, an address for the communication within the measurement apparatus 10 is stored in the memory 32. Furthermore, a position information is stored in the memory 32 which codes the position of the partial section 32 within the sequential arrangement of the partial sections 18*a-c* of the physical scale 12. This will be explained in the following in detail with reference to FIGS. 7 to 10.

The control 30 is in the position to independently determine the position of the reading head 14 at the physical scale 12 and indeed initially as an absolute value within the partial section 18 and not merely incrementally and to output this measurement value via the interfaces 28*a-b*. The partial section 18 thus has the functionality of an independent encoder. The absolute position which for the time being is referred to the partial section 18 is converted into an absolute position with regard to the overall physical scale by further measures which are explained down below.

Figure 4:
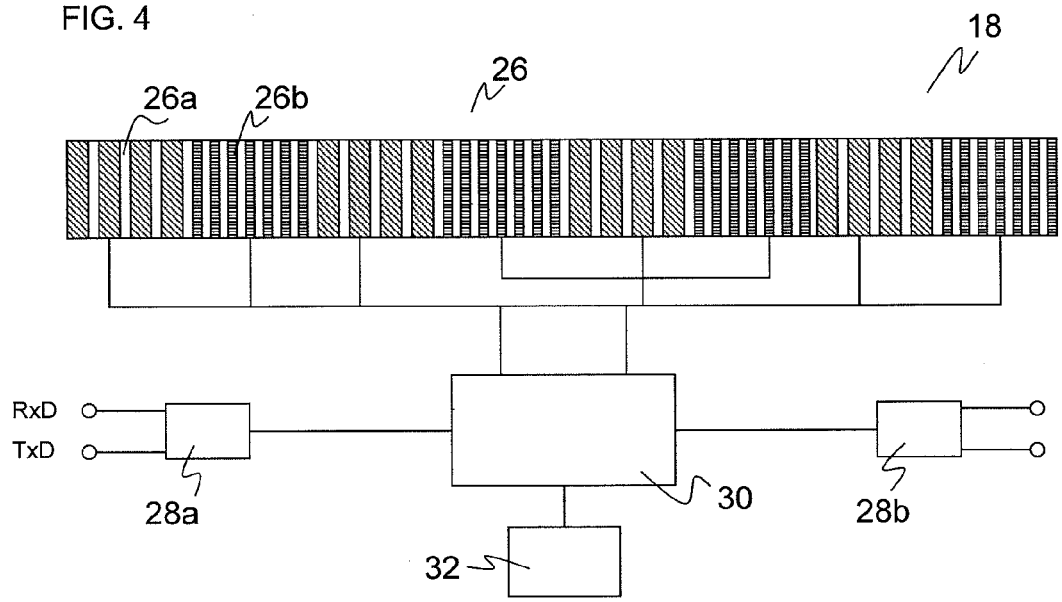
FIG. 4 a block diagram of the partial section in accordance with FIG. 2.

In a simplified block diagram FIG. 4 shows an exemplary embodiment of a coding 26 and its connection to the controller 30. The symbolically illustrated coding 26 here only has a respectively coarse coding 26*a* and a fine coding 26*b*. On switching on, the position of a reading head 14 is initially quickly found by means of the coarse coding 26*a*, the actual measurement values are determined with the fine coding 26*b* in the course of operation. The control unit 30 is in a position to activate partial regions of the coding 26 and thus to determine the position of an active reading head 14 or a passive reading head 14 via the coding 26 due to corresponding multiple number of connections. Alternatively, it is possible to use a passive absolute coding 26 whose mightiness encompasses the partial section 18, the largest possible partial section 18*a-c* and even a plurality of partial sections 18*a-c* and evaluates these with an active reading head 14.

Such a determined position is communicated via the interfaces 28*a-b*, or positions or other information are received and passed on along the sequential arrangement of the plurality of partial sections 18*a-c* of the physical scale 12. The interfaces 28*a-b* can include further connections such as for a ground connection, for a frequency connection or for a supply line.

Figure 5:
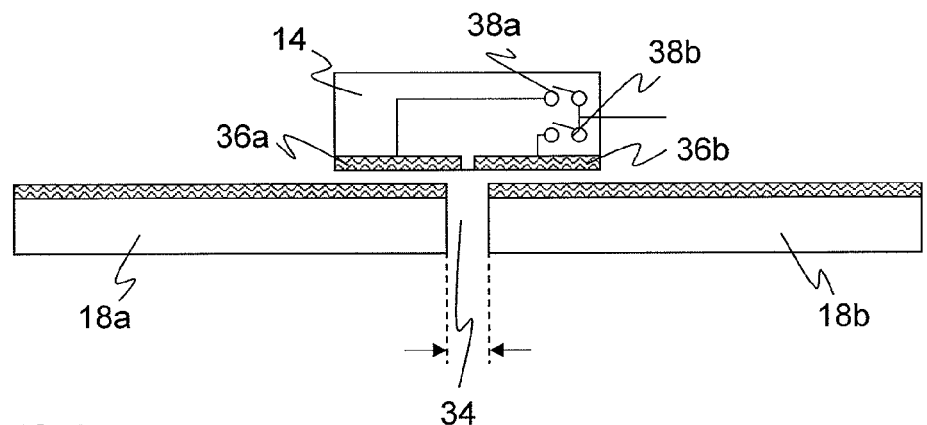
FIG. 5 a schematic sectional illustration, corresponding to FIG. 3, of the transition of two partial sections for the explanation of a compensation of the error arising there.

In a simplified sectional illustration FIG. 5 illustrates how the inevitable gaps at a transition 34 between two partial sections 18*a-b*, whose width varies due to tolerances of the wide gap, can be measured. For this reason the reading head 14 has two partial zones 36*a-b* which can interact with the coding and also with two switches 38*a-b* with which both partial zones 36*a-b* can be activated or selectively only one of the partial zones 36*a-b* of the reading head 14 can be activated.

The transition 34 is measured when the reading head 14 is arranged between the associated partial sections 18*a-b*, ideally when the reading head 14 is arranged at approximately the middle thereof. For this reason the position with regard to the first partial section 18*a* is measured by means of a first partial zone 36*a* and the position with regard to the second partial section 18*b* is measured by means of the second partial zone 36*b*. A deviation of these two positions corresponds precisely to the width of the transition 34 and/or to an error with regard to an expected width of this transition 34. This deviation is stored in the partial section 18*a*, in the partial section 18*b*, in the starting section 20 and/or the main control 24 for the consideration during the further operation.

Two partial zones 36*a-b* are only meaningful for an active reading head 14, it is alternatively plausible both for an active reading head and also for a passive reading head to proceed in a manner analog to the one just described to determine the position of the reading head using only one common zone first by using a local field emitted by a partial section 18*a* and then using a local field emitted from the second partial section 18*b*.

The reading head 14 is wide enough to allow measurements at the transition 34 with regard to both partial sections 18*a-b*. In particular, the reading head 14 can be a little wider than one of the partial sections 18*a-b* or wider than the largest partial section 18*a-c* used to ensure these conditions.

Figure 6:
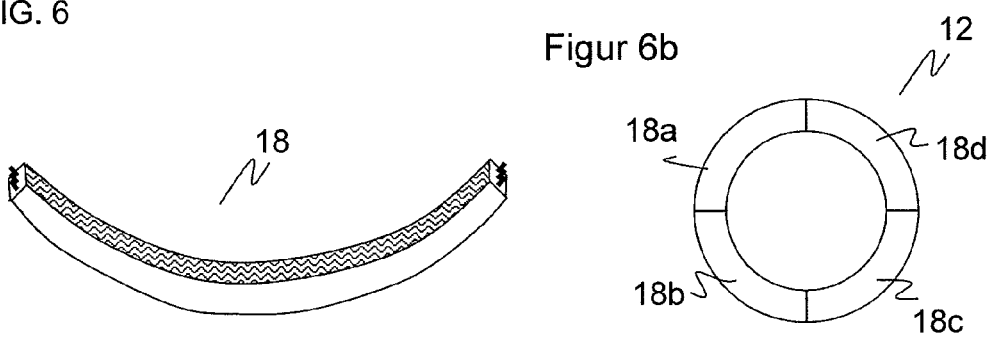
FIG. 6a a schematic three-dimensional outer view of a curved partial section for a measurement apparatus for the determination of angles.
FIG. 6b a schematic sectional illustration for the explanation of the composition of partial sections to a circle in accordance with FIG. 6b.

FIG. 6*a* shows an alternative shape of a partial section 18 which has a curvature. As is illustrated in FIG. 6*b* a plurality of partial sections 18*a-d* can thus be connected cyclically to a circuit. The determined path then corresponds to an angle in an arcuate measure, so that the measurement apparatus 10 can also be used as an absolute rotary encoder. The curvature is fixedly defined for fixed housings of the partial sections 18*a-d*, so that the partial sections 18*-d* can be connected to a circle with a previously set radius. Alternatively, an elastic material can be used for the housing, for example an elastomer, so that the curvature of the partial section can be set with conducting cards of the coding 26, at least within certain boundaries, which conducting cards are anyhow flexible. As a rule a calibration on the micrometer scale is lost and/or is not possible, however, the measurement apparatus 10 can also be used in this manner for applications requiring lesser accuracy. In an analogous manner also other curved paths, such as opened and closed paths are possible.

It shall now be explained with reference to FIGS. 7-10 how the position values within the individual partial sections 18a-d are calculated to an absolute position value with regard to the physical scale 12.

Figure 7:
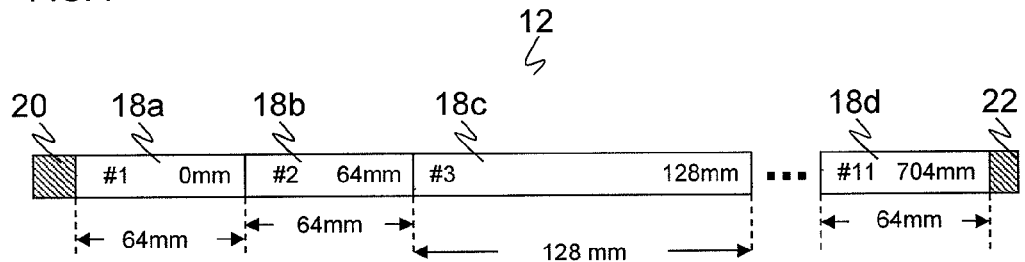
FIG. 7 an annotated sectional illustration of a physical scale for the explanation of stored position information and the self-configuration.

FIG. 7 describes an initial self-configuration of the physical scale 12. Starting from the starting section 20, each subsequent partial section 18a-d is prompted to assign itself an address and to also assign itself a displacement with regard to the starting section and to store this in the memory 32 and/or this information is provided to a subsequently arranged partial section 18a-d from the starting section 20 or the main control 16. The first partial section 18a thus receives the number #1 and it has a cumulated displacement of 0 mm with regard to the start. As a further partial section 18b is connected the self-configuration is continued for this partial section 18b and receives the number #2 as well as a cumulated displacement of 64 mm, which is the sum of the cumulated displacement of the partial section 18a arranged upstream thereof and the length of 64 mm of the partial section 18a arranged upstream thereof. This is continued in an analog manner up to the final partial section 18d having the number #11 and a cumulated displacement of 704 nm. Thus, the self-configuration is completed as only an end section 22 is arranged downstream of the partial section 18d and thus no further partial section is arranged down-stream thereof. All length data are drawn to the millimeter scale in the Figures for better clarity, in practice they can have three or four decimal points.

The numbers #1 to #11 can simultaneously serve as communication addresses and are only to be understood in an exemplary manner. It is only important that these numbers allow clear conclusions on the position of the associated partial sections 18a-d within the sequential arrangement of the partial sections 18a-d. It is not necessarily required to store the cumulated displacement in the memory 32, as this displacement can be calculated in the control unit 32 or in the main control 16 from the position of each partial section 18a-d within the physical scale 12, as well as being calculated from known lengths of the partial section 18a-d as well as from the type of the partial sections 18a-d in the control unit 32 or in the main control 16.

With the help of the displacement the position of the reading head 14 can easily be related to the physical scale 12. For example, if a partial section 18c and/or its control unit 30 measures a reading head 14 to be at 99 mm with regard to the partial section 18c then the associated cumulated displacement of the partial section 18c of 128 mm is added thereto to obtain an absolute position of 99 mm+128 mm=227 mm with regard to the starting section 20 of the physical scale 12.

Figure 8:
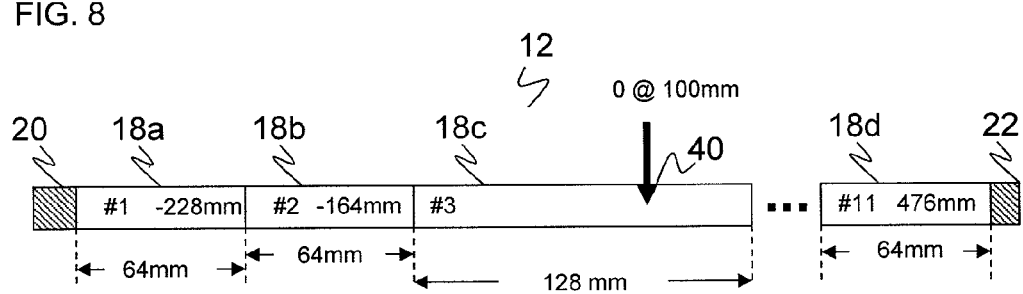
FIG. 8 an annotated sectional illustrated of a physical scale for the explanation of the selection of a zero point.

FIG. 8 discusses a displacement of the zero point of a physical scale 12, i.e. the reference point of a physical scale 12. For this reason a new zero point 40 is provided, for example by means of a calibration button at the reading head 14 which is located at this position. Following this, the position of the reading head 14 is determined, which in this case is 100 mm with regard to the partial section 18c and also 100 mm+128 mm=228 mm with regard to the starting section 20 of the physical scale 12. The cumulated displacement in all partial sections 18a-d is downscaled by this value of 228 mm and thus the zero point is displaced.

Figure 9:
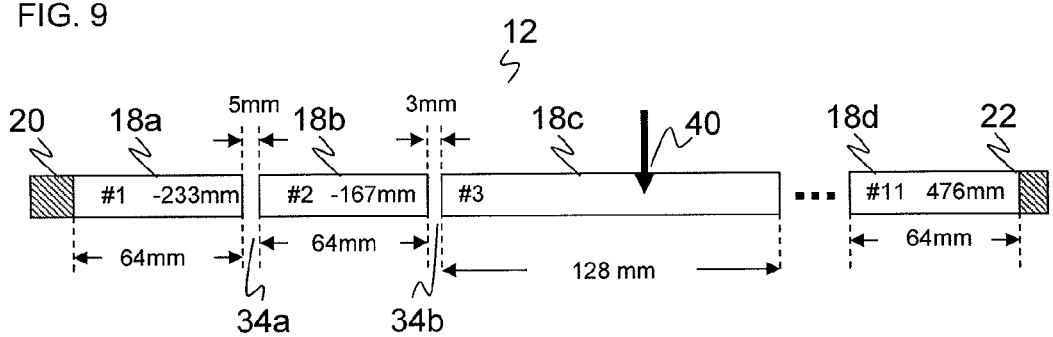
FIG. 9 an annotated sectional illustration of a physical scale for the explanation of the compensation of errors arising at transitions between two partial sections.

FIG. 9 illustrates the gap compensation already discussed in accordance with FIG. 5. A transition 34a of 3 mm width between the partial sections 18a and 18b is illustrated and a transition 34b of 5 mm width between the partial sections 18b and 18c is also illustrated. Practically such wide transitions are mechanically preventable and have a width which is significantly less than 1 mm, but to illustrate the functional principle the millimeter scale used so far is not abandoned.

As soon as the reading head 14 arrives at the transition 34b from its zero point 40 its width is measured using the method described with reference to FIG. 5. The cumulated displacement of all partial sections 18a-b lying on the same side with regard to the zero point 40 are corrected by the width of this transition 34a which is 3 mm. This is correspondingly carried out for each transition 34a-b.

The physical scale can be initially completely calibrated by means of an initial calibration run from the zero point 40 to all of the transitions 34a-b. If only one reading head 14 is used, the calibration is however also dynamically possible, as the reading head 14 only arrives at a measurement position by passing all relevant transitions 34a-b between the zero point 40 and the measurement position. Alternatively, it is also possible to initially assume experience values for the width of the transition 34a-b and to correct these when a reading head 14 arrives at the transition 34a-b. In this case the physical scale 12 is also only completely calibrated when all transitions 34a-b have been considered and initially only delivers an erroneous measurement value which can however be sufficient in many applications.

Figure 10:
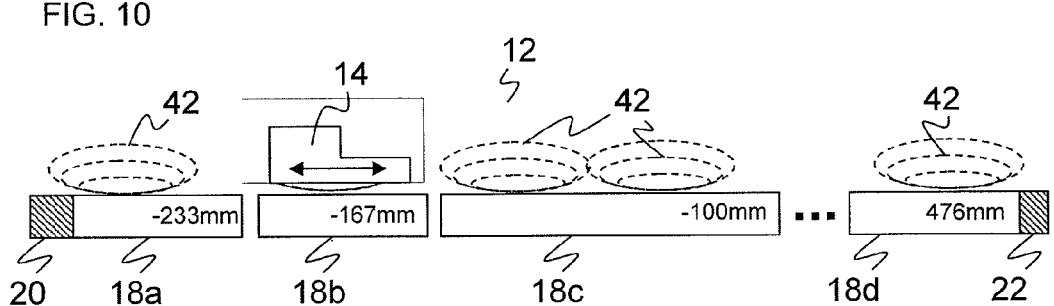
FIG. 10 an annotated sectional illustration of a physical scale for the explanation of the initial position multiplexing for the position determination of reading heads.

FIG. 10 illustrates the detection of the reading headings on starting up by means of position multiplexing. For this reason all partial sections 18a-d are sequentially activated which for their part sequentially generate local fields 42 at all positions. The local fields 42 shown in 42 are thus not simultaneously active, but successively active. At the position of a reading head 14 this is recognized due to its interaction with the local field 42. As long as a reading head 42 is present the procedure can be aborted at this position, otherwise it is carried on until all reading heads 14 have been detected or all positions have been examined. In the further operation the position of the reading head 14 is known, so that local fields 42 only have to be generated in its surrounding to monitor the displacement of the reading heads 42.

The invention claimed is:

1. A measurement apparatus (10) for the absolute value determination of lengths or of angles, comprising:

said apparatus having at least one reading head (14) and a physical scale (12) which has at least a partial section (18) with a connection (28) for another partial section (18) in a sequential arrangement, wherein the partial section (18) includes a control unit (30) for the active determination of the position of the reading head (14) proximal to the partial section (18) as well as a storage element (32) in which an own position information of the partial section (18) within the physical scale (12) can be stored, wherein the reading head (14) is configured to generate a respective measurement value for both partial sections (18c) at a transition (34) between two partial sections (18), and wherein the measurement apparatus (10) comprises means for deriving a correction value for the transition (34) from the difference of the two measurement values.

2. A measurement apparatus (10) in accordance with claim 1 wherein the physical scale (12) is self-configuring in that the control unit (30) is adapted to receive its own position information from a connected other partial section (18) or to derive its own position information from a position information of a connected other partial section (18).

3. A measurement apparatus (10) in accordance with claim 1 wherein the reading head (14) is active and generates a field which interacts with a field (42) generated by the physical scale (12) or, wherein the reading head (14) is passive and modifies a field (42) generated by the physical scale (12) or reflects a field (42) to the physical scale (12).

4. A measurement apparatus in accordance with claim 1 wherein the control unit (30) is configured to generate a field (42) at each position of the partial section (18) to evaluate whether a reading head (14) is present proximal to the partial (18) section and at which position the reading head (14) is proximal to the partial section (18), wherein the result of the evaluation can be emitted via the connection (28).

5. A measurement apparatus (10) in accordance with claim 1 wherein a deviation of its own position measurement of the partial section (18) from a reference is stored in the storage element (32) to calibrate the partial section (18).

6. A measurement apparatus (10) in accordance with claim 1 wherein the physical scale (12) has curved partial sections (18) for an angle measurement.

7. A measurement apparatus (10) in accordance with claim 6 wherein the partial sections (18) can be bent to different radii of curvature.

8. A measurement apparatus (10) in accordance with claim 1 wherein a main control (16) is provided which is electrically connected to the physical scale (12) and is connected to the beginning and the end of the sequential arrangement.

9. A measurement apparatus (10) in accordance with claim 8 wherein the main control (16) is also connected to the actively configured reading head (14).

10. A measurement apparatus (10) in accordance with claim 1 wherein a starting section (20) is provided at the beginning of the sequential arrangement and an end section (22) is provided at the end of the sequential arrangement.

11. A measurement apparatus (10) in accordance with claim 10 wherein the main control (16) is at least partially integrated into the starting section (20) or into the end section (22).

12. A measurement apparatus (10) in accordance with claim 1 wherein the physical scale (12) and the reading head (14) are configured for an inductive measurement, a capacitive measurement or a magnetic measurement of lengths or of angles.

13. A method for the absolute value determination of lengths or of angles having at least one reading head (14) and a physical scale (12) which is formed from a sequential arrangement of partial sections (18), wherein a partial section (18) actively measures the position of the reading head (14) proximal to the partial section (18), wherein the position of the partial section (18) within the sequential arrangement is determined by means of a position information stored in the partial section (18) and wherein the absolute value is determined from the position within the partial section (18) and the position of the partial section (18) within the sequential arrangement wherein a respective measurement value for both partial sections (18) is generated when the reading head (14) is positioned at a transition (34) between two partial sections (18), and wherein a correction value for the transition (34) derives from the difference between the two measurement values.

14. A method in accordance with claim 13 wherein the physical scale (12) is self-configured in that, in sequence, each partial section (18) starting with a first partial section assigns itself a position information in a self-configuration mode or is assigned a position information and subsequently places a partial section (18) arranged downstream thereof into the self-configuration mode.

15. A method in accordance with claim 13 wherein the position information of one of the two partial sections (18) is compensated by the correction value.

16. A method in accordance with claim 13 wherein the physical scale (12) is calibrated wherein each partial section (18) stores deviations to a reference value, wherein a zero point (40) for the physical scale (12) is determined, in particular for one of the reading heads (14), and distances at a transition (34) between two partial sections (18) are corrected to the zero point (40) on movement of the reading head (14) across the transition (34).

17. A method in accordance with claim 16 wherein a zero point (40) for one of the reading heads (14) is determined, and distances at a transition (34) between two partial sections (18) are corrected to the zero point (40) on movement of the reading head (14) across the transition (34).

18. A method in accordance with claim 13 wherein for an initial determination of the position of reading heads (14) each location of the physical scale (12) is checked through the generation of a local field (42) by means of position multiplexing to see whether a reading head (14) is present and wherein subsequently in operation only a local field (42) is respectively generated in the vicinity of a reading head (14).

* * * * *